(12) United States Patent
Blackhurst

(10) Patent No.: US 10,183,708 B2
(45) Date of Patent: Jan. 22, 2019

(54) ARTICULATED VEHICLE

(71) Applicant: Ronald Samuel Blackhurst, Derbyshire (GB)

(72) Inventor: Ronald Samuel Blackhurst, Derbyshire (GB)

(*) Notice: Subject to any disclaimer, the term of this patent is extended or adjusted under 35 U.S.C. 154(b) by 42 days.

(21) Appl. No.: 15/264,158

(22) PCT Filed: Mar. 16, 2015

(86) PCT No.: PCT/GB2015/050762
§ 371 (c)(1),
(2) Date: Sep. 13, 2016

(87) PCT Pub. No.: WO2015/136314
PCT Pub. Date: Sep. 17, 2015

(65) Prior Publication Data
US 2017/0158264 A1    Jun. 8, 2017

(30) Foreign Application Priority Data
Mar. 14, 2014   (GB) .................................. 1404542.1

(51) Int. Cl.
*B62D 53/02*   (2006.01)
*B62D 12/00*   (2006.01)
(Continued)

(52) U.S. Cl.
CPC .............. *B62D 53/026* (2013.01); *B62B 1/18* (2013.01); *B62D 12/00* (2013.01); *B62D 51/004* (2013.01);
(Continued)

(58) Field of Classification Search
CPC .... B62D 53/026; B62D 53/02; B62D 53/025; B62D 12/00; B62D 51/008; B62B 1/18
See application file for complete search history.

(56) References Cited

U.S. PATENT DOCUMENTS 3,035,654 A    5/1962  Clifford et al.
3,291,244 A  * 12/1966  Garrett ................. B60K 17/342
                                                      180/235
(Continued)

FOREIGN PATENT DOCUMENTS

FR    2554394 A1    5/1985
GB     914238 A    12/1962
(Continued)

*Primary Examiner* — Joseph M Rocca
*Assistant Examiner* — Marlon A Arce
(74) *Attorney, Agent, or Firm* — Adler Pollock & Sheehan P.C.; Daniel J. Holmander, Esq.

(57) ABSTRACT

A vehicle has first and second parts with at least one road wheel. The first part pivotally connects to a connecting member at two spaced apart points to pivot about a first axis relative and the second part pivotally connects to the connecting member at two spaced apart points 18 to pivot about a second axis, which is perpendicular to the second axis, intersecting at a pivot point. A first drive shaft rotatably mounts to the first part and extends in a direction perpendicular to a longitudinal axis of the first part, a second drive shaft rotatably mounts to the second part and extends in a direction perpendicular to a longitudinal axis of the second part. The first and second drive shafts connect by a universal joint so that the two shafts to pivot relative to each other about the pivot point.

24 Claims, 7 Drawing Sheets

(51) Int. Cl.
  *B62D 51/00* (2006.01)
  *B62B 1/18* (2006.01)
(52) U.S. Cl.
  CPC ......... *B62D 51/008* (2013.01); *B62D 53/021* (2013.01); *B62D 53/025* (2013.01)

(56) References Cited

U.S. PATENT DOCUMENTS

| | | | | |
|---|---|---|---|---|
| 3,504,753 A * | 4/1970 | Rutley | ................. | B60F 3/0061 |
| | | | | 114/123 |
| 3,620,322 A * | 11/1971 | Peterson | .............. | B62D 53/026 |
| | | | | 180/235 |
| 4,356,878 A * | 11/1982 | Kestian | ................ | B62D 53/025 |
| | | | | 180/235 |
| 4,930,589 A * | 6/1990 | Henline | ................. | B60R 21/34 |
| | | | | 172/508 |
| 5,873,431 A * | 2/1999 | Butler | .................... | B62D 12/00 |
| | | | | 180/418 |
| 8,875,817 B2 * | 11/2014 | Giles-Brown | .......... | F16B 21/00 |
| | | | | 180/14.4 |
| 9,193,385 B2 * | 11/2015 | Svardby | ................. | B62D 12/00 |
| 2005/0039973 A1 * | 2/2005 | Clark | .................... | B62D 12/00 |
| | | | | 180/418 |
| 2007/0131437 A1 | 6/2007 | Sewell | | |
| 2012/0211973 A1 * | 8/2012 | Werner | ................ | B62D 53/025 |
| | | | | 280/781 |

FOREIGN PATENT DOCUMENTS

| | | | |
|---|---|---|---|
| GB | 1040335 A | 8/1966 | |
| GB | 1118359 A | 7/1968 | |
| GB | 1157374 A | 7/1969 | |

* cited by examiner

ARTICULATED VEHICLE

RELATED APPLICATIONS

This application is a national phase filing under 35 U.S.C. § 371 of International Application No. PCT/GB2015/050762 filed Mar. 16, 2015, which claims priority from Great Britain application number 1404542.1, filed Mar. 14, 2014, the entire contents of each are hereby incorporated by reference herein.

TECHNICAL FIELD OF THE INVENTION

The present invention relates to an articulated vehicle, and particularly but not exclusively to a pedestrian or compact ride-on articulated vehicle.

BACKGROUND TO THE INVENTION

Articulated vehicles having two connected parts, each part having a fixed, driven axle supporting two road wheels, where the angle between the two parts may be altered in order to steer the vehicle are used in a variety of construction and mining applications, amongst others. The vehicles are well suited to use on difficult terrain. The two parts of the vehicle are connected by a joint which allows the parts to pivot about a vertical axis to enable the vehicle to be steered, and about a longitudinal axis which enables the two parts of the vehicle to roll relative to one another which helps to keep the wheels in contact with the ground.

An engine is provided in one part of the vehicle and drive to the wheels of the other part is transmitted from the engine to the other part via a propeller shaft which accommodates movement between the two parts of the vehicle. The propeller shaft extends generally longitudinally between the two parts. It is provided with two universal joints and a sliding joint and connected to a differential on an axle of one of the parts so as to drive wheels mounted to half shafts extending from the differential in a direction substantially perpendicular to the propeller shaft.

The various joints required in the propeller shaft make the arrangement relatively complex and costly, making an articulated construction uneconomic for smaller, and particularly pedestrian, vehicles where the market demands a lower cost. Also, torque reaction through the propeller shaft when the vehicle is driven causes the two parts of the vehicle to roll relative to one another and this can make the vehicle difficult to control. This can be a greater problem for smaller lightweight vehicles.

Embodiments of the present invention have been made in consideration of these problems.

SUMMARY OF THE INVENTION

According to the present invention there is provided an articulated vehicle comprising first and second parts, each part having a least one respective road wheel and a longitudinal axis running substantially parallel to the intended direction of travel of that part of the vehicle, wherein the two parts are connected together by a connecting member, the first part is pivotally connected to the connecting member at two spaced apart points to pivot about a first axis relative to the connecting member and the second part is pivotally connected to the connecting member at two spaced apart points to pivot about a second axis relative to the connecting member, the first and second axes are substantially perpendicular to each other and intersect at a pivot point, a first drive shaft is rotatably mounted to the first part and extends in a direction substantially perpendicular to the longitudinal axis of the first part, a second drive shaft is rotatably mounted to the second part and extends in a direction substantially perpendicular to the longitudinal axis of the second part and the first and second drive shafts are connected by a universal joint which allows the two shafts to pivot relative to each other about the pivot point.

Thus, the connecting member allows the two parts of the vehicle to pivot relative to one another about two substantially perpendicular axes. As both the joint between the two parts and the universal joint permit movement about the same pivot point the driveshafts need only be provided with a single universal joint. This simplifies the construction of the vehicle and reduces costs.

The connecting member may comprise a body supporting one or more fittings on the first axis and one or more fittings on the second axis by which fittings the connecting member is pivotally connected to the first and second parts of the vehicle. Preferably there are two or more fittings on each axis.

Each fitting may be one part of a rotary bearing, with the other part of the rotary bearing being on a part of the vehicle. Each fitting may be a shaft and may be substantially cylindrical. Each fitting may be an aperture or opening for receiving a shaft. Where there are two fittings on the same axis these may be located respectively on opposite sides of the body of the connecting member.

The body of the connecting member may define an opening in which the two axes intersect. The universal joint may be disposed in the opening. The body may extend around the opening. It may take the form of a closed shape which extends continuously around the opening, for example a square, rectangle, other polygon, or other shape or a ring. The ring may be formed by a cylinder. The body may be a regular shape. The body may be a symmetrical shape. A closed, regular shape lends inherent strength to the connecting member, reducing the amount of material required to produce it.

The first or second drive shaft may be drivingly connected respectively to the road wheel or wheels of the first or second part.

Each part of the vehicle may have a transverse axis extending substantially at right angles to its longitudinal axis, and extending in a plane which is parallel to a plane in which the longitudinal axis extends. The connecting member may be arranged to allow the two parts of the vehicle to pivot relative to each other about the longitudinal axis of one part, and about an axis extending perpendicular to the plane in which the longitudinal axis lies. Typically these axes will be an upright axis which enables the two parts to be pivoted in order to steer the vehicle and the longitudinal axis, or an axis parallel to the longitudinal axis, which enables the two parts to roll relative to one another.

The first drive shaft may extend parallel to the transverse axis of the first part. The second drive shaft may extend parallel to the transverse axis of the second part.

The first or second drive shaft may be drivingly connected to an axle which extends parallel to the drive shaft. A respective road wheel may be mounted to each end of the axle. The first or second drive shaft may be drivingly connected to the axle by way of a differential. The first or second drive shaft may be connected to the axle by way of a chain or belt drive. The other of the first and second drive shaft may be drivingly connected to an output shaft of a drive unit. The output shaft may extend parallel to the drive shaft. The drive shaft may be connected to the output shaft by way of a chain or belt drive.

A steering mechanism may be provided connecting a user operable steering control, such as handlebars or a steering wheel, mounted to one part of the vehicle and to the connecting member and operative to pivot one relative to the other thereby to steer the vehicle.

Each part may be fitted with two drive wheels mounted to a fixed axle.

The vehicle may be a pedestrian vehicle. It may be a ride-on vehicle and may be a compact ride on vehicle. The vehicle may be a utility vehicle for carrying a load such as a dumper, carrier or for performing a function such as driving a snow plough.

DETAILED DESCRIPTION OF THE INVENTION

In order that the invention may be more clearly understood embodiments thereof will now be described, by way of example only, with reference to the accompanying drawings, of which:

Figure 1:
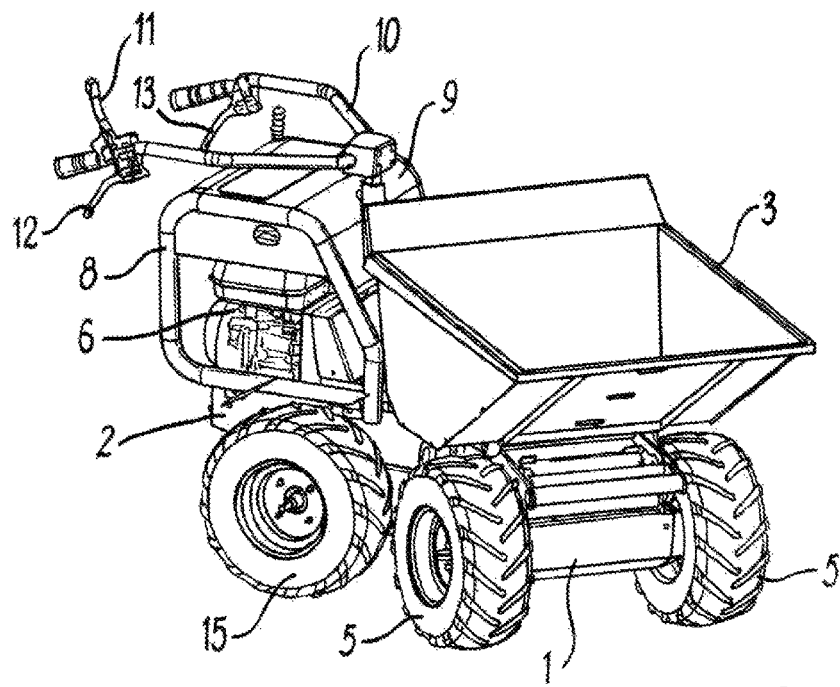
FIG. 1 is a perspective view of a vehicle from the front.
Figure 2:
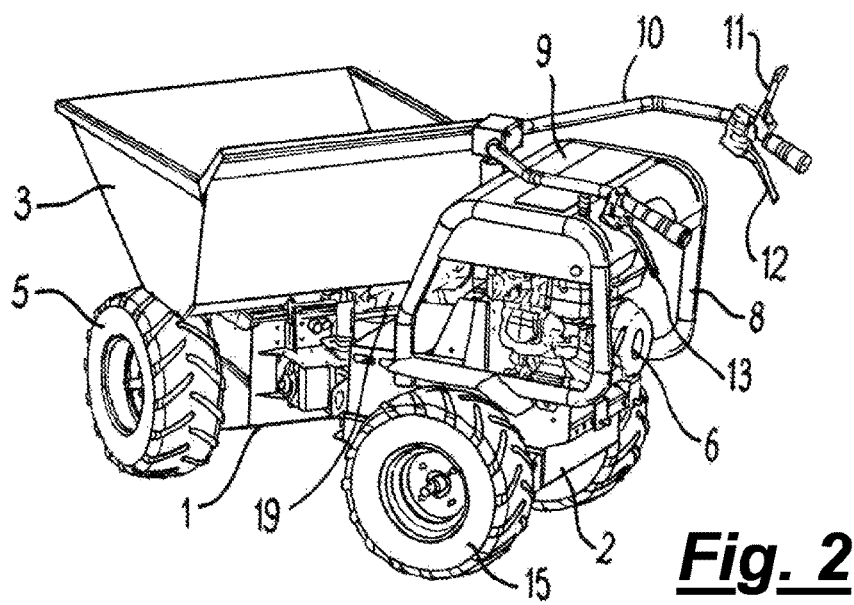
FIG. 2 is a perspective view of the vehicle of FIG. 1 from the rear.
Figure 3:
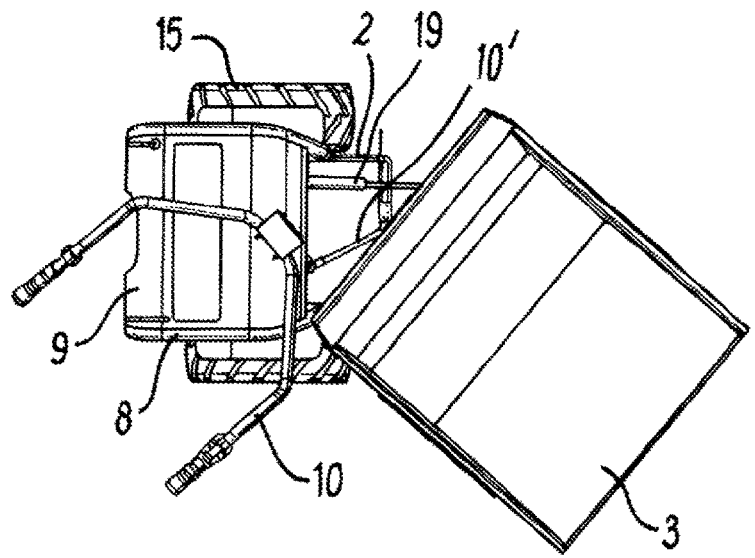
FIG. 3 is a plan view of the vehicle of FIG. 1.
Figure 4:
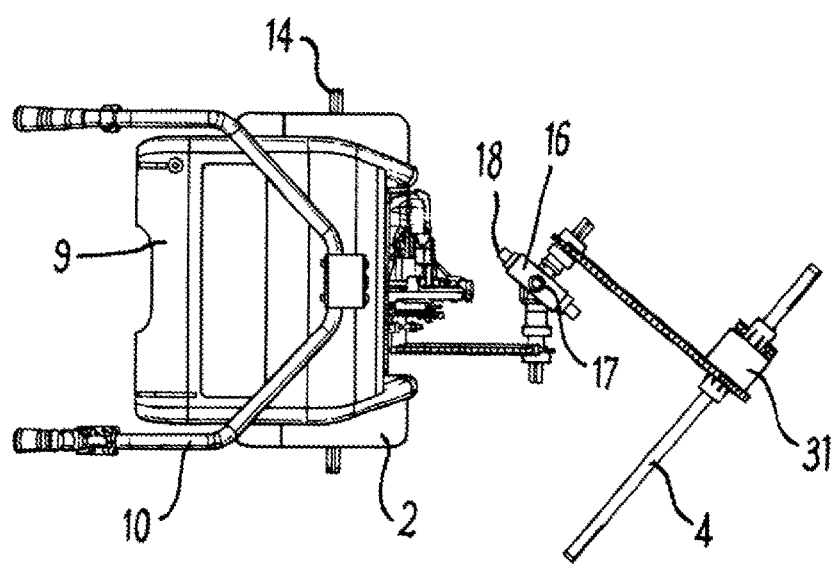
FIG. 4 is a corresponding view to FIG. 3 cut away to show hidden detail.
Figure 5:
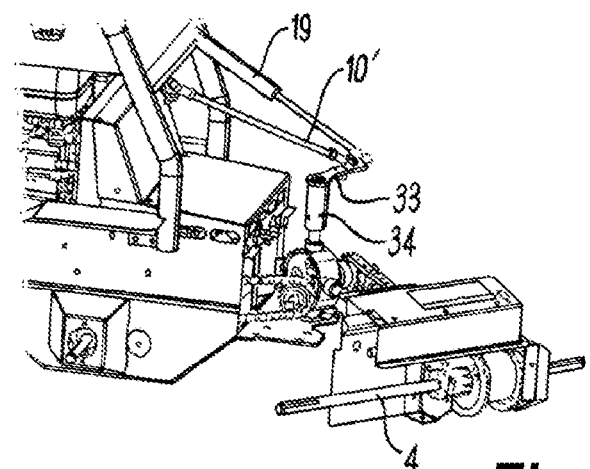
FIG. 5 is an enlarged part cut away perspective view of part of the vehicle shown in FIG. 1.
Figure 6:
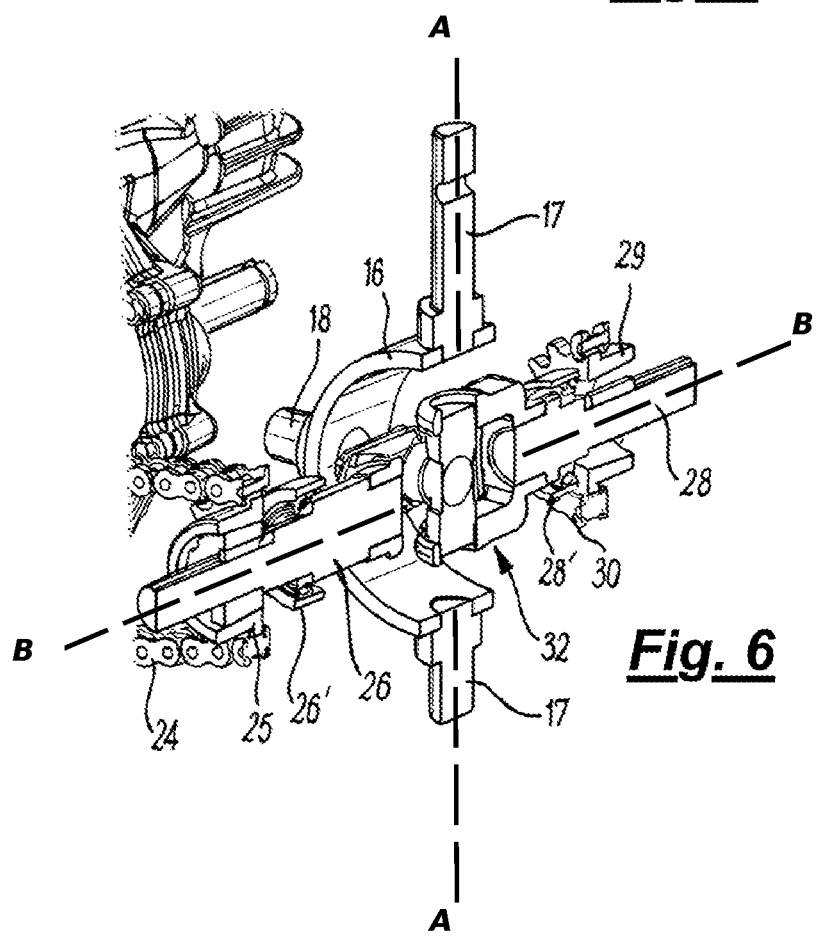
FIG. 6 is an enlarged view of part of FIG. 5, showing a cross-section through the universal joint.
Figure 7:
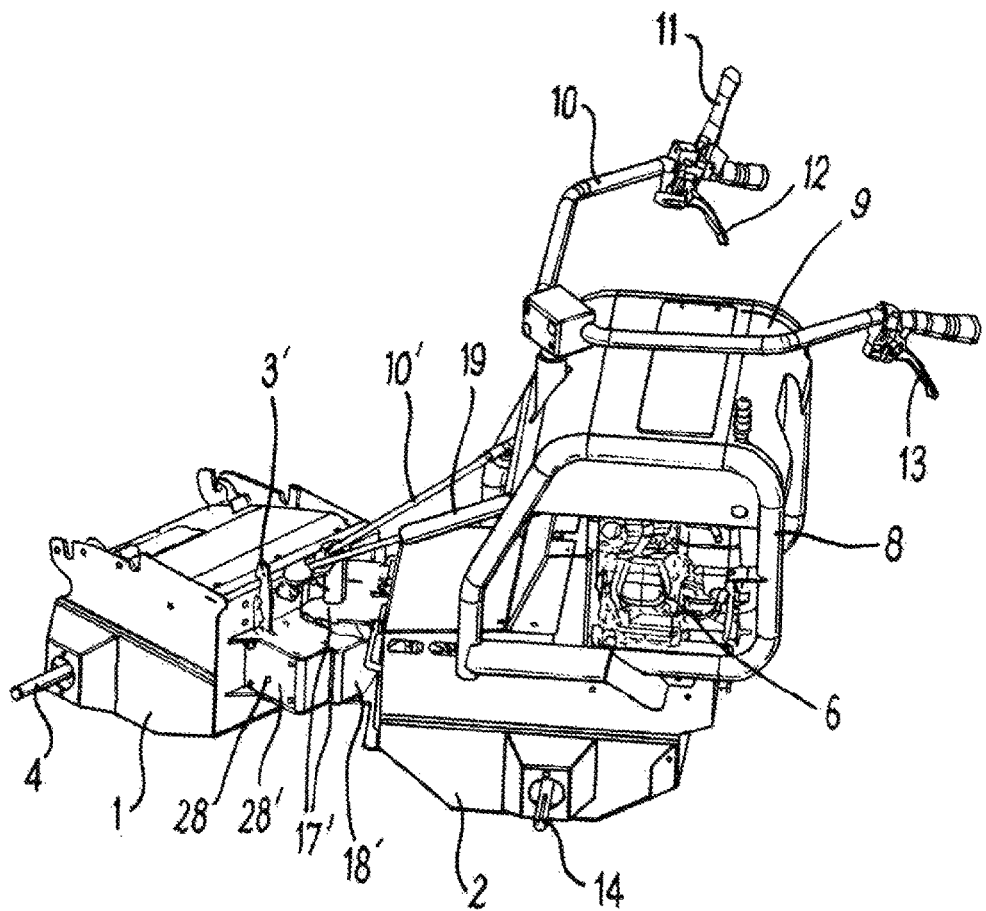
FIG. 7 is a perspective view of the vehicle of FIG. 1 from the side with road wheels and bucket removed.

In the drawings the terms front, rear, top, bottom and like terms are used to refer to the illustrated vehicle and components thereof in the orientation in which it is illustrated, and in which it is intended to be used, but should not be taken as otherwise limiting.

Referring to the drawings there is shown an articulated, pedestrian dumper vehicle. The vehicle comprises a front chassis 1 connected to a rear chassis 2 by way of an articulated joint.

A bucket 3 for carrying a load is pivotally mounted to the front chassis 1, for movement about a transverse axis to enable a load in the bucket to be dumped out in front of the vehicle. The bucket is retained in the position shown by a mechanical catch 3'. To empty the bucket a user releases the catch and manually pivots the bucket forwards.

A transverse front axle 4 is rotatably mounted to the front chassis 1, supporting a respective road wheel 5 at each side of the chassis.

An internal combustion engine 6 is mounted on the rear chassis 2. Of course it will be appreciated that other power sources or prime movers could be used, such as an electric motor. The engine 6 is connected to a hydrostatic transmission having an output shaft 7. The engine 6 is protected by a tubular frame 8 which supports body panels 9. Handlebars 10 are pivotally mounted to the rear chassis 2, for movement about a generally upright axis. The right hand handle of the handlebars is provided with a brake release lever 11, and a forward drive control lever 12. The left hand handle is provided with a reverse drive control lever 13. A transverse rear axle 14 is rotatably mounted to the rear chassis 2, supporting a respective road wheel 15 at each side of the chassis.

The front 1 and rear 2 chassis are connected together via a connecting member 16. The connecting member comprises a short, cylindrical ring 16. Extending radially from the outside surface of the ring are two pairs of diametrically opposed substantially cylindrical shafts. The first pair of shafts 17 are aligned along an upright axis A-A and received into respective opposed bearings 17' mounted to the rear chassis 2. This allows the rear chassis 2 to pivot about an upright axis relative to the connecting member. The top shaft (as illustrated) is about twice the length of the bottom shaft. The second pair of shafts 18 are each about the same length of the bottom shaft 17 and aligned along a horizontal, longitudinal axis B-B which extends perpendicular to the plane in which the upright axis extends, and intersects the upright axis at pivot point in the centre of the ring 16. The shafts 18 of the second pair are received into respective bearings 18' mounted to the front chassis 1. This allows the front chassis to pivot about a horizontal longitudinal axis relative to the connecting member 16.

Figure 9:
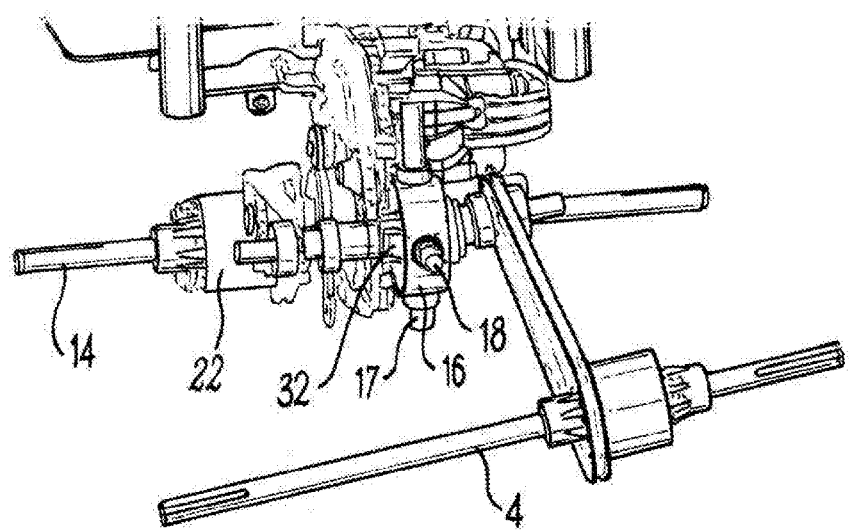
FIG. 9 is an enlarged view of part of the drive arrangement of the vehicle in the state shown in FIG. 8.
Figure 10:
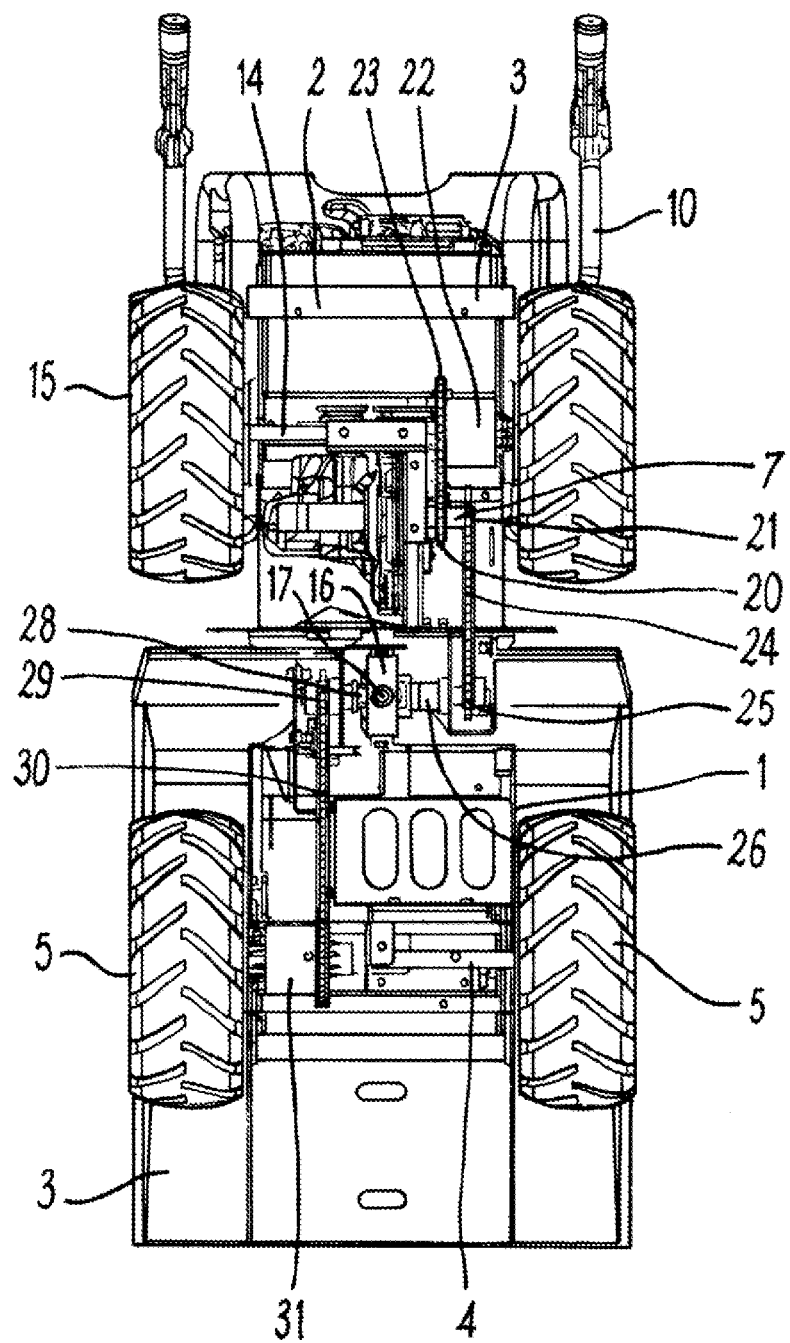
FIG. 10 is an underplan view of the vehicle of FIG. 1.

The connecting member therefore allows the front and rear chassis 1, 2 to pivot relative to one another about an upright axis to enable the vehicle to be steered. FIGS. 1 to 5 and 7 all show the front chassis 1 pivoted relative to the rear chassis 2 to enable the vehicle to turn to the right as it moves forward. FIG. 9 shows the vehicle with the longitudinal axis of each chassis aligned so that the vehicle will travel in a straight line.

To enable a user to turn the vehicle, the handlebars 10 are connected to a steering rod 10' which connects to an arm 33 extending radially from a tubular sleeve 34 which is mounted to the top shaft 17 of the connecting member so that it is rotationally fixed relative to the connecting member. Rotation of the handlebars 10 therefore causes rotation of the connecting member, and therefore the front chassis 1, relative to the rear chassis 2, to steer the vehicle. A gas damper 19 is also fitted between the front chassis 1 and arm 33 in order to damp relative pivotal movement of the two chassis. This ensures that sudden shocks, for example as a result of either of the chassis running into or over an obstacle, do not cause the two chassis 1, 2, and thus also the handlebars 10, to move suddenly relative to one another. This makes the vehicle more manageable.

Figure 8:
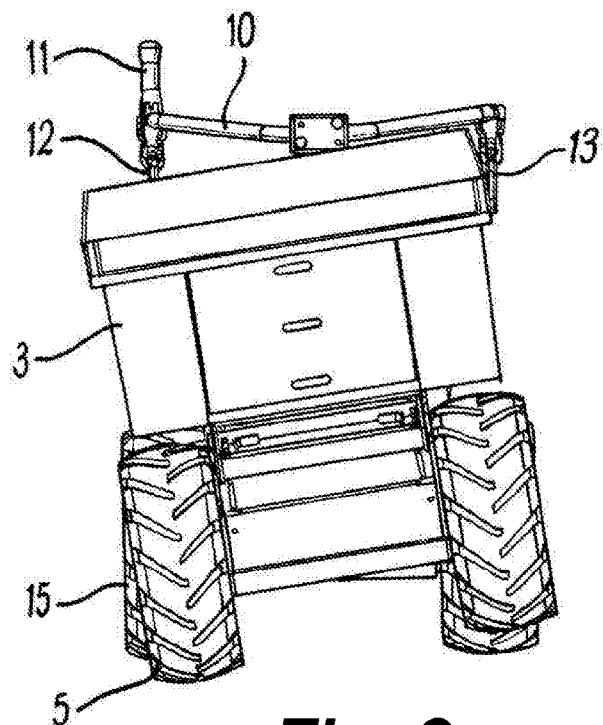
FIG. 8 is a front elevation of the vehicle of FIG. 1.

The connecting member also allows the front 1 and rear 2 chassis to pivot relative to one another along their respective longitudinal axes, as shown in FIGS. 8 and 9. This enables the two chassis 1, 2 to move relative to one another as the vehicle moves over uneven ground without the road wheels 5, 15 of either chassis leaving contact with the ground.

The internal combustion 6 engine is arranged to drive all four road wheels 5, 15 of the vehicle.

The output shaft 7 of the hydrostatic transmission extends transversely across the rear chassis 2 and thus substantially parallel to the rear axle 14. The output shaft is fitted with two sprockets 20, 21. A chain 23 extends around the first sprocket 20, and around a sprocket on a differential 23 mounted to the rear axle 14, thereby to drive the road wheels 15 of the rear chassis.

A further chain 24 extends around the second sprocket 21 on the output shaft and around a sprocket 25 fitted to a half shaft 26. The half shaft is rotatably mounted to the rear chassis transversely via bearing 26' so that it extends parallel to the output shaft 7 and extends towards, but stops short of, the pivot point.

A corresponding half shaft 28 is rotatably mounted transversely to the front chassis 1 via bearing 28' so that is extends parallel to the front axle 4. A sprocket 29 on the half shaft 28 is connected by a chain 30 to a sprocket of a differential 31 mounted to the front axle 4. The half shaft 28 extends towards, but stops short of the pivot point.

The two half shafts 26, 28 are connected by a universal joint 32 which extends through the ring 16 of the connecting member and allows the two half shafts to pivot relative to one another about the pivot point. The universal joint allows drive to be transmitted from the output shaft 7 of the transmission to the front axle 4 of the front chassis 1 whilst accommodating relative pivotal movement of the front and rear chassis about both an upright axis and longitudinal axis.

The universal joint may be of any suitable conventional type.

In use the vehicle is driven from the handlebars 10 by a user. Before the vehicle can be driven the brake, which is of a failsafe type, must be released by depressing the brake lever 11 down onto the handlebar grip, and holding it there against a resilient bias. Then, either of the drive control levers 12, 13 is squeezed towards its associated handlebar grip against a resilient bias in order to drive the vehicle forwards or backwards. Progressive squeezing of the control increases the amount of effort applied by the internal combustion engine 6 to turn the road wheels 5, 15.

Because the universal joint 32 allows the two half shafts 26, 28 to pivot about the same point as that about which the connecting member enables the two chassis 1, 2 to pivot it is only necessary to provide one universal joint in the drive train to the front axle 4, and it is not necessary to provide any sliding joints in the drive train.

Additionally, as the half shafts 26, 28, extend transversely in each chassis 1, 2 torque reaction when the vehicle is driven does not seek to move the two chassis relative to one another in a manner which is permitted by the connecting member. The transverse mounting of the half shafts also enables relative low cost chain driven differential units to be employed.

It will be appreciated that the connecting member need not take the form of a ring. Any shape may be employed provided that it is capable of supporting the four shafts 17 and 18 in the appropriate orientation and defining an opening through which the connected drive shafts 26, 28 and universal joint 32 can extend. The connecting member shown in the vehicle of FIGS. 1 to 10 is formed from a metal ring, cut from a tube, drilled to receive studs to form the four shafts.

Figure 11:
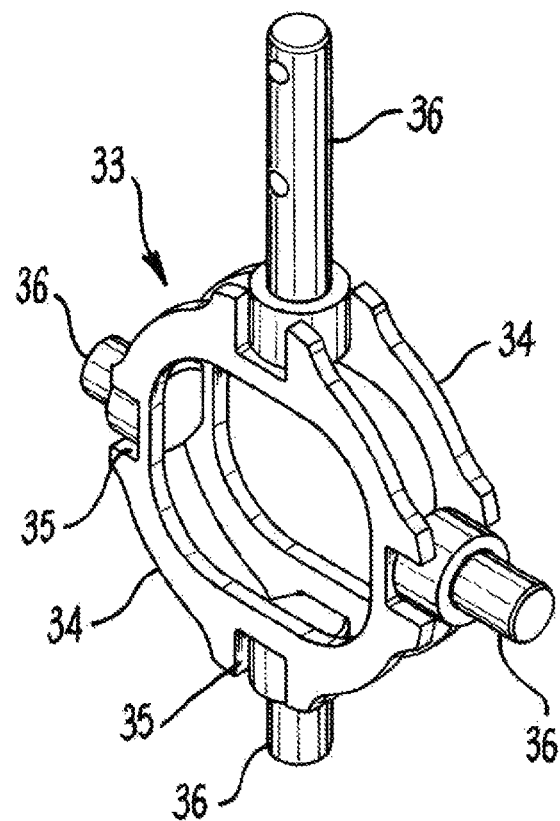
FIG. 11 is a perspective view of an alternative form of connecting member for use with the vehicle of FIGS. 1 to 10.

FIG. 11 shows an alternative form of connecting member 33. This is formed of a pair of metal plates 34, laser cut from a sheet of metal. The plates are of substantially the same shape. They define a generally square opening with rounded corners. Two pairs of opposed U-shaped slots 35 are cut into opposite sides of each plate. The slots have spaced apart, straight parallel sides and a base extending perpendicularly to the sides. Two slots are aligned on a first axis, and the other two on a substantially perpendicular axis. The connecting member further comprises four machined shafts 36, each comprising a substantially cylindrical base with a first diameter from which extends a substantially cylindrical shaft with a reduced diameter. A shoulder is formed where the diameter of the shaft changes. The diameter of the base of each shaft is greater than the width of the U-shaped slots. The two plates are parallel to each other, spaced apart and with the slots 35 in one plate aligned with those of the other. The four shafts are sandwiched between the plates with the base of each shaft received as far as possible into each slot and therefore contacting edges and the base of each slot. The shafts are welded to the plates to hold the member together. Two shafts lie on one axis and the other two lie on a substantially perpendicular axis. One shaft is about twice the length of the other three, which are all substantially the same length. This connecting member performs the same function as, and is interchangeable with, the connecting member of the vehicle illustrated in FIGS. 1 to 10 but it is more easily and economically produced.

The above embodiments are described by way of example only. Many variations are possible without departing from the scope of the invention as defined in the appended claims.

The invention claimed is:

1. An articulated vehicle comprising first and second parts, each part having a least one respective road wheel and a longitudinal axis running substantially parallel to the intended direction of travel of that part of the vehicle, wherein the two parts are connected together by a connecting member, the first part is pivotally connected to the connecting member at two spaced apart points to pivot about a first axis relative to the connecting member and the second part is pivotally connected to the connecting member at two spaced apart points to pivot about a second axis relative to the connecting member, the first and second axes are substantially perpendicular to each other and intersect at a pivot point, a first drive shaft is rotatably mounted to the first part and extends in a direction substantially perpendicular to the longitudinal axis of the first part, a second drive shaft is rotatably mounted to the second part and extends in a direction substantially perpendicular to the longitudinal axis of the second part and the first and second drive shafts are connected by a universal joint which allows the two shafts to pivot relative to each other about the pivot point.

2. An articulated vehicle as claimed in claim 1 wherein the connecting member comprises a body supporting one or more fittings on the first axis and one or more fittings on the second axis by which fittings the connecting member is pivotally connected to the first and second parts of the vehicle.

3. An articulated vehicle as claimed in claim 2 wherein there are two or more fittings on each axis.

4. An articulated vehicle as claimed in claim 3 wherein two fittings on each axis are located respectively on opposite sides of the body.

5. An articulated vehicle as claimed in claim 2 wherein each fitting comprises one part of a rotary bearing, with the other part of the rotary bearing being on a part of the vehicle.

6. An articulated vehicle as claimed in claim 5 wherein one or more fitting is a shaft.

7. An articulated vehicle as claimed in claim 5 wherein one or more fitting is an aperture or opening for receiving a shaft.

8. An articulated vehicle as claimed in claim 1, wherein the connecting member comprises a body, and the body defines an opening in which the two axes intersect.

9. An articulated vehicle as claimed in claim 8 wherein the universal joint is disposed in the opening.

10. An articulated vehicle as claimed in claim 8 wherein the body extends around the opening.

11. An articulated vehicle as claimed in claim 10 wherein the body takes the form of a closed shape which extends around the opening.

12. An articulated vehicle as claimed in claim 1 wherein each part of the vehicle has a transverse axis, extending substantially at right angles to the longitudinal axis, the longitudinal and transverse axes each lying in respective parallel planes, and the two parts may be pivoted relative to each other about the longitudinal axis of one part, and about an axis extending perpendicular the to the plane in which the longitudinal axis of the first or second part lies.

13. An articulated vehicle as claimed in claim 12 wherein the first drive shaft extends parallel to the transverse axis of the first part and the second drive shaft extends parallel to the transverse axis of the second part.

14. An articulated vehicle as claimed in claim 1 wherein either the first or second drive shaft is drivingly connected to an axle which extends parallel to the drive shaft.

15. An articulated vehicle as claimed in claim 14 wherein the first or second drive shaft is drivingly connected to the axle by way of a differential.

16. An articulated vehicle as claimed in claim 14 wherein the first or second drive shaft is connected to the axle by way of a chain or belt drive.

17. An articulated vehicle as claimed in claim 14 wherein the other of the first and second drive shaft is drivingly connected to an output shaft of a drive unit.

18. An articulated vehicle as claimed in claim 17 wherein the output shaft extends parallel to the drive shaft.

19. An articulated vehicle as claimed in claim 17 wherein the drive shaft is connected to the output shaft by way of a chain or belt drive.

20. An articulated vehicle as claimed in claim 1 comprising a steering mechanism connecting a user operable steering control mounted to one part of the vehicle to the connecting member and operative to pivot one relative to the other thereby to steer the vehicle.

21. An articulated vehicle as claimed in claim 1 wherein each part is fitted with at least two drive wheels mounted to a fixed axle.

22. An articulated vehicle as claimed in claim 1 wherein the vehicle is a pedestrian vehicle.

23. An articulated vehicle as claimed in claim 1 wherein the vehicle is a compact ride-on vehicle.

24. An articulated vehicle as claimed in claim 1 wherein the vehicle is a utility vehicle for carrying a load.

\* \* \* \* \*